(12) United States Patent
Reinhard et al.

(10) Patent No.: US 12,453,521 B2
(45) Date of Patent: Oct. 28, 2025

(54) MOBILE MEDICAL DEVICE, MOBILE DEVICE, AND METHOD

(71) Applicant: Siemens Healthcare GmbH, Erlangen (DE)

(72) Inventors: Malte Reinhard, Nuremberg (DE); Alexander Gemmel, Erlangen (DE); Josef Zeidler, Marktredwitz (DE); Franz Dirauf, Bad Staffelstein (DE)

(73) Assignee: Siemens Healthineers AG, Forchheim (DE)

( * ) Notice: Subject to any disclaimer, the term of this patent is extended or adjusted under 35 U.S.C. 154(b) by 410 days.

(21) Appl. No.: 17/613,031

(22) PCT Filed: May 24, 2019

(86) PCT No.: PCT/EP2019/063459
§ 371 (c)(1),
(2) Date: Nov. 19, 2021

(87) PCT Pub. No.: WO2020/239187
PCT Pub. Date: Dec. 30, 2020

(65) Prior Publication Data
US 2022/0240878 A1    Aug. 4, 2022

(51) Int. Cl.
*A61B 6/00*    (2024.01)

(52) U.S. Cl.
CPC .......... *A61B 6/4405* (2013.01); *A61B 6/4441* (2013.01); *A61B 2560/0431* (2013.01);
(Continued)

(58) Field of Classification Search
CPC .................. A61B 2560/0487; A61B 6/4441
See application file for complete search history.

(56) References Cited

U.S. PATENT DOCUMENTS

| 6,276,485 B1 | 8/2001 | Eriksson et al. |
| 2005/0100134 A1 | 5/2005 | Bauer et al. |

(Continued)

FOREIGN PATENT DOCUMENTS

| CN | 102421364 A | 4/2012 |
| CN | 102551753 A | 7/2012 |

(Continued)

OTHER PUBLICATIONS

International Search Report and the Written Opinion for International Patent Application PCT/EP2019/063459 mailed Mar. 24, 2020.

*Primary Examiner* — David P Porta
*Assistant Examiner* — Shun Lee
(74) *Attorney, Agent, or Firm* — Lempia Summerfield Katz LLC

(57) ABSTRACT

The invention relates to a mobile medical device, in particular a mobile C-arm X-ray device, comprising a device trolley which can be driven in at least two movement modes in a motor-supported manner, having at least one gripping element, which is provided for gripping by means of at least one human hand of an operator in order to move the device, and additionally having at least one sensor, which is arranged on the gripping element or in the direct vicinity thereof and is designed to detect measurement data that characterizes the type and/or location of the grip by means of the at least one human hand, an evaluating unit, which is designed to evaluate the measurement data with respect to the type and/or location of the grip and assign a movement mode of the device trolley, and a control unit for automatically setting the evaluated movement mode of the device trolley.

15 Claims, 2 Drawing Sheets

(52) U.S. Cl.
CPC ............... *A61B 2560/0437* (2013.01); *A61B 2560/0462* (2013.01); *A61B 2560/0487* (2013.01)

(56) References Cited

U.S. PATENT DOCUMENTS

| | | |
|---|---|---|
| 2010/0322377 A1 | 12/2010 | Niizeki |
| 2012/0093294 A1 | 4/2012 | Lalena et al. |
| 2012/0106701 A1 | 5/2012 | Meek |
| 2012/0114106 A1 | 5/2012 | Dippl |
| 2012/0296528 A1 | 11/2012 | Wellhoefer |
| 2017/0215826 A1* | 8/2017 | Johnson ............... H02G 11/006 |
| 2018/0160992 A1 | 6/2018 | Shirota |
| 2019/0046281 A1 | 2/2019 | Johnson et al. |
| 2020/0170594 A1* | 6/2020 | Makino ................. A61B 6/548 |
| 2022/0211568 A1* | 7/2022 | AlGhazi ............... A61B 5/1117 |

FOREIGN PATENT DOCUMENTS

| | | |
|---|---|---|
| CN | 102785689 A | 11/2012 |
| CN | 205433721 U | 8/2016 |
| CN | 106102582 A | 11/2016 |
| CN | 106923848 A | 7/2017 |
| EP | 3257463 A1 | 12/2017 |
| JP | H066067 U | 1/1994 |
| JP | 2002233521 A | 8/2002 |
| JP | 2005118555 A | 5/2005 |
| JP | 2011125371 A | 6/2011 |
| JP | 2011167296 A | 9/2011 |
| JP | 2014236830 A | 12/2014 |
| JP | 2020081746 A | 6/2020 |
| WO | 2008052752 A1 | 5/2008 |

* cited by examiner

MOBILE MEDICAL DEVICE, MOBILE DEVICE, AND METHOD

This application is the National Stage of International Application No. PCT/EP2019/063459, filed May 24, 2019. The entire contents of this document are hereby incorporated herein by reference.

BACKGROUND

The present embodiments relate to a mobile medical device having a device trolley that may be moved in at least two movement modes in a motor-assisted manner, a mobile device having a device trolley that may be moved in at least two movement modes in a motor-assisted manner, and a method for operating assistance for such a mobile medical device.

Mobile X-ray devices that are arranged on device trolleys and provided with wheels and may be moved over the hospital floor have a particularly high degree of flexibility with regard to their applicability in different areas or rooms. In this regard, good manual movability is to exist in practice and, for example, it is to be possible for the device to be steered and controlled and for brakes to be able to be applied by an operating person. The device is as easily controllable as possible during moving, and the equipment necessary for control allows a compact design of the device in order to keep the space requirement of the device as small as possible.

More recent hand-steered X-ray devices have motor-assisted movability in order to facilitate the operation and/or transport of the device for the operating person.

In addition, modern hand-steered motorized X-ray devices have a plurality of degrees of freedom depending upon the grade and type and the arrangement of the wheels. Depending on the context of use, it is desirable to prefer or to block individual degrees of freedom. For example, when being moved along a corridor from one operating room to another operating room, a mobile X-ray device is to be moved rapidly primarily in the forward direction and in curves, while in the operating room at the operating table, the mobile X-ray device is to be moved slowly and precisely forward and sideways. Mobile devices therefore often offer the possibility of selecting particular movement modes (e.g., movement only in the forward direction) using switches or an operating button in order to communicate to the system in which movement mode the mobile X-ray device should move. Movement profiles (e.g., acceleration, velocities) may also be set in this way.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a mobile medical device having a device trolley that may be moved in at least two movement modes in a motor-assisted manner, which enables an improved operability of the device, is provided. As another example, a method for operating assistance for the device is provided.

A mobile medical device according to the present embodiments (e.g., a mobile C-arm X-ray device having a device trolley that may be moved in at least two movement modes in a motor-assisted manner) having at least one gripping element is provided. The at least one gripping element is provided for a gripping by at least one human hand of an operating person for moving the device. The mobile medical device also has at least one sensor that is arranged on the gripping element or in the direct vicinity thereof and is configured to capture measurement data characterizing the manner and/or the location of the gripping by the at least one human hand. The mobile medical device includes an evaluating unit that is configured to evaluate the measurement data with regard to the manner and/or the location of the gripping, and to associate the measurement data with a movement mode of the device trolley. The mobile medical device also includes a control unit for automatic setting of the evaluated movement mode of the device trolley.

In order to facilitate the movability, the mobile medical device or the device trolley has a known motor assistance (e.g., servo assistance) that provides that the force expenditure for moving the device is significantly reduced for the operating person. A movement mode may be a particular pre-setting in which one or more characteristics of the movability of the device (e.g., move slowly, move quickly, translations, curves, sideways movements, etc.) are particularly supported and/or others are supported or blocked less or not at all. Thus, for example, a movement mode may be configured to support a rapid movement of the device trolley in the straight ahead direction and/or in curves and to prevent a sideways movement, and this movement mode may be provided for transport of the device from one room into another room. Another movement mode may be configured for covering small distances (e.g., in the range of centimeters) slowly from a standing position in all possible directions, and this movement mode may be provided for positioning the device in the operating room. A further movement mode may be configured for covering medium distances (e.g., in the range of meters) and curves slowly, and this movement mode may be provided for moving the device in the operating room into a parking position.

The present embodiments also include a method for automatic operating assistance for a mobile medical device with a device trolley that may be moved in at least two movement modes in a motor-assisted manner and at least one gripping element for a gripping by at least one human hand of an operating person for moving the device trolley. The method includes capturing measurement data characterizing the manner and/or the location of the gripping by the at least one human hand, evaluating the measurement data with regard to the manner and/or the location of the gripping and associating the measurement data with a movement mode of the device trolley, and automatic setting of the determined movement mode of the device trolley.

The mobile medical device according to the present embodiments and the method according to the present embodiments have many advantages. By the automatic recognition of the gripping characteristic of the operating person and automatic conversion into a movement mode, the operation of the mobile X-ray device is simplified and becomes particularly intuitive for the operating person. There results a decisive time advantage and an increase in the efficiency of medical examinations. The operating person may carry out a blind operation without difficulty, may direct his attention to other more important tasks, and does not need to undertake a manual selection of movement profiles since this is carried out automatically by the mobile device. The automatic recognition of gripping characteristics and association with particular movement modes is particularly reliable and fault-proof and simplifies the operation of the medical device for the operating person to a high degree.

According to one embodiment, the sensor or sensors is/are configured to capture measurement data characterizing the number of gripping hands and/or the size of the gripping hand or hands and/or the position of the gripping hand or hands and/or the contact area of the gripping hand or hands and/or the grip tightness of the gripping and/or a gripping profile of an operating person. Such gripping characteristics are particularly suitable for providing conclusions regarding a movement of the device planned or intended by the operating person, so that by recognizing one or more of these characteristics, an automatic selection of a movement mode is possible in a particularly easy and fault-proof manner.

According to a further embodiment, the at least one sensor is formed by at least one capacitive sensor. Capacitive sensors are particularly reliable and effective in the recognition of fingers or hands of persons. These sensors may also be integrated particularly easily and cost-effectively into the gripping element. For example, a plurality of sensors may also be arranged on or in the direct vicinity of the gripping element. Complete gripping elements may also be constructed from capacitive sensors in order to provide a particularly reliable recognition. In addition, further sensors may be provided (e.g., resistive sensors, proximity sensors, light sensors, pressure sensors, or cameras).

According to a further embodiment, the at least two movement modes may be set in a personalized manner for at least two operating persons. In order to achieve this, for example, by the capture of the gripping characteristic, the operating person may also be detected, for example, by the size of the hands, and the personalized movement mode can be set accordingly. Alternatively, using an additional camera and image recognition software, the operating person may be recognized, and then, the movement mode may be set in a personalized manner.

According to a further embodiment, a first movement mode is configured such that on setting the first movement mode, a rapid movement of the device trolley over distances >2 m is supported. According to a further embodiment, a second movement mode is configured such that on setting the second movement mode, a slow movement over distances of less than 15 cm is supported. These are generally the fundamentally most important movement modes, in principle. These may however also be configured significantly more specifically, for example, by blocking or supporting particular other movement types. Other movement modes may also be provided in which one or more characteristics of the movability of the device (e.g., move slowly, move quickly, translations, curves, sideways movements, etc.) are particularly supported and/or others are supported or blocked less or not at all. A plurality of different movement modes may also be present.

According to one embodiment, the mobile medical device is formed by a mobile C-arm X-ray device having a rotatable C-arm that is adjustable in a plurality of degrees of freedom.

According to a further embodiment, a first gripping element is configured for pushing and/or pulling the device trolley that may be moved in at least two movement modes in a motor-assisted manner and a second gripping element for a gripping by at least one human hand of an operating person for motor-assisted adjustment of the C-arm. In this context, it may be provided that the second gripping element has at least one sensor that is arranged on the gripping element or in the direct vicinity thereof and is configured to capture measurement data characterizing the manner and/or the location of the gripping by the at least one human hand. The evaluating unit is configured to evaluate the measurement data with regard to the manner and/or the location of the gripping and to associate the measurement data with an adjustment mode of the C-arm, and the control unit is configured for automatic setting of the evaluated adjustment mode. In this case, the adjustability of the C-arm also has a servo assistance. An adjustment mode herein may be, similarly to the movement mode, a particular pre-setting in which one or more characteristics of the adjustability of the C-arm (e.g., adjusting slowly, adjusting quickly, rotations, translations, etc.) are particularly supported and/or others are supported or blocked less or not at all. Using the second gripping element and the corresponding embodiment of the medical device, the operation of the mobile device is also simplified and is configured to be particularly intuitive for the operating person.

According to a further embodiment, the mobile medical device has a display unit for displaying information relating to the activated movement mode. This display may, for example, also be integrated onto or into the gripping element or may be arranged at least in the direct vicinity thereof. This may be, for example, an LED display. Such a display unit has the advantage that an operating person may immediately recognize at a glance which movement mode has been automatically selected.

In addition, the present embodiments relate to a mobile device having a device trolley that may be moved in at least two movement modes in a motor-assisted manner, having at least one gripping element. The at least one gripping element is provided for a gripping by at least one human hand of an operating person for moving the device. The mobile device also has at least one sensor that is arranged on the gripping element or in the direct vicinity thereof and is configured to capture measurement data characterizing the manner and/or the location of the gripping by the at least one human hand. The mobile device includes an evaluating unit that is configured to evaluate the measurement data with regard to the manner and/or the location of the gripping and to associate the measurement data with a movement mode of the device trolley. The mobile device also includes a control unit for automatic setting of the evaluated movement mode of the device trolley. The mobile device may be, for example, a shopping trolley or a warehouse transport platform. For example, the present embodiments may be used for mobile devices with a high specific weight in order to provide easy maneuverability.

DETAILED DESCRIPTION

Figure 1:
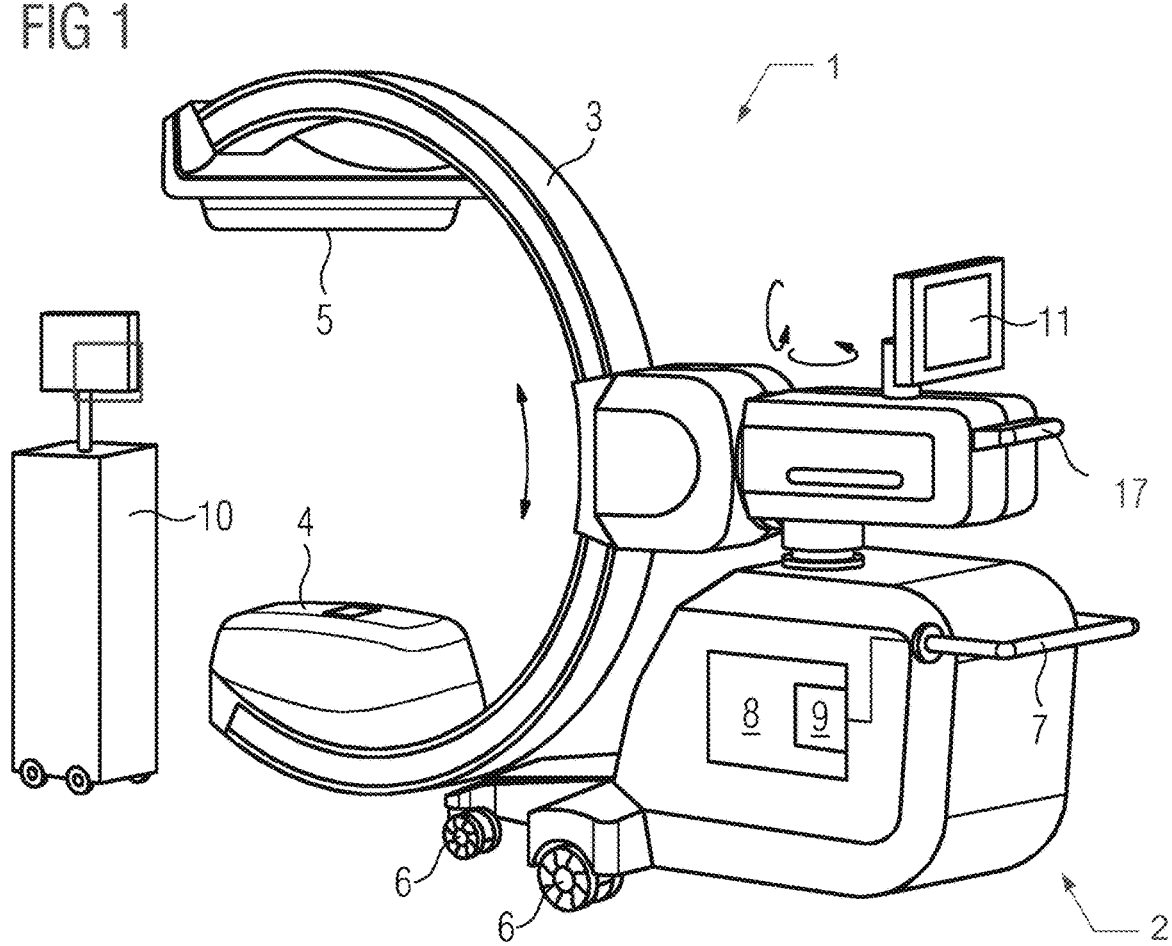
FIG. 1 shows a view of one embodiment of a mobile C-arm X-ray device with a gripping element.

FIG. 1 shows one embodiment of a mobile C-arm X-ray device 1 that has a C-arm 3 arranged on a device trolley 2. The C-arm 3 is arranged on the device trolley 2 by one or more mechanical connections such that the C-arm 3 is adjustable in a plurality of degrees of freedom. For example, the C-arm 3 may be rotated (see arrows), tilted, and translated. Arranged at one end on the C-arm 3 is an X-ray source 4, and an X-ray detector 5, by which X-ray recordings of an examination object may be acquired in a plurality of possible recording positions (e.g., angulations), is arranged at the other end. The mobile C-arm X-ray device 1 is controlled by a system control unit 8. The device trolley 2 has a plurality (e.g., two, three, or four) multi-directional or omni-directional wheels 6 by which the device trolley 2 may be moved and displaced forward, laterally, and/or in curves. The wheels may each have dedicated drives. In general, the mobile C-arm X-ray device is pushed and/or moved by an operating person. For this purpose, the device trolley includes a gripping element 7 that an operating person may grasp with one or both hands in order to push or pull the device trolley 2. Two or more gripping elements may also be arranged on the device trolley 2. The movability is additionally power-assisted so that the device has a servo drive (known, not shown here) that assists the operating person during moving in a motor-assisted manner. In this way, the mobile C-arm X-ray device 1 may be easily moved in all directions.

In the context of the motor-assisted movability, the mobile C-arm X-ray device 1 has at least two different movement modes. A movement mode may herein be a particular pre-setting in which one or more characteristics of the movability of the device trolley (e.g., moving slowly, moving quickly, translations, curves, sideways movements, etc.) are particularly supported and/or others are supported or blocked less or not at all. Thus, for example, a movement mode may be configured to support a rapid movement of the device trolley in the straight ahead direction and/or in curves and to prevent a sideways movement, and this movement mode may be provided, for example, for transport of the device trolley over distances greater than 4 m, for example, from one room into another room. Another (e.g., second) movement mode may be configured for covering small distances (e.g., under 50 cm) slowly from a standing position in all possible directions, and this movement mode may be provided for positioning (e.g., fine positioning) of the device in the operating room. A further (e.g., third) movement mode may be configured for covering medium distances (e.g., between 50 cm and 4 m) and curves slowly, and this movement mode may be provided for moving the device in the operating room into a parking position. Further or alternative movement modes with, for example, only one characteristic (e.g., fast, slow, etc.) may also be available.

Figure 2:
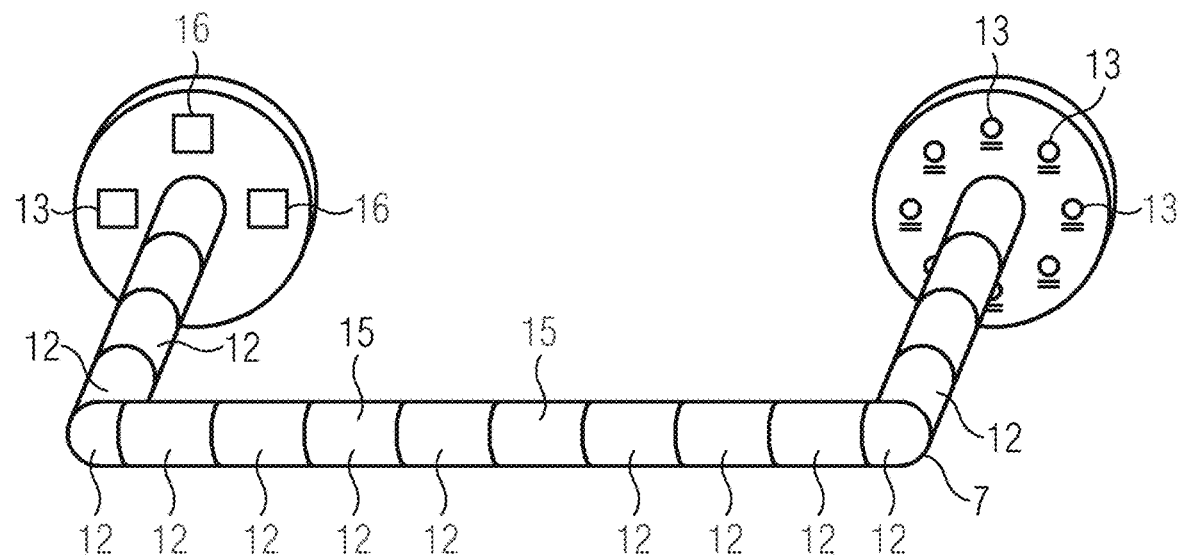
FIG. 2 shows a view of one embodiment of a gripping element.

For a particularly intuitive operation in relation to the movability, the C-arm X-ray device has a plurality of components that provide an automatic setting of the currently required operating mode. Thus, a plurality of capacitive sensors 12 are integrated into the gripping element 7, as shown, for example, enlarged in FIG. 2. The capacitive sensors 12 are configured to capture measurement data regarding the gripping by the operating person (e.g., where exactly and at how many positions of the gripping element 7 gripping takes place). The measurement data is then passed on to an evaluating unit 9 that is configured to evaluate the measurement data. Thus, from the measurement data, the evaluating unit 9 evaluates the manner and the location of the gripping by the hands of the operating person. The evaluating unit 9 may evaluate, for example, whether the operating person grips with one or with both hands, how many fingers are involved, how firm the grip is, where exactly gripping takes place, and how strongly in which direction pressing takes place and/or may create, for example, a gripping profile.

Alternatively, the gripping element 7 may have further sensors for a more exact characterization of the manner of the gripping or of a gripping profile of the operating person (e.g., pressure sensors 15, resistive sensors, proximity sensors, light sensors, or camera sensors 16). The measurement data from these sensors is also evaluated by the evaluating unit 9 with regard to the manner and the location of the gripping. Further, the operating person herself may also be recognized, for example, based on a handling pattern or even by facial recognition or fingerprint recognition. Subsequently to the evaluation of the measurement data with regard to the manner and/or the location of the gripping by the operating person, the evaluating unit 9 associates the determined characteristics with one of the existing movement modes. This identified movement mode is then interpreted as the movement mode intended by the operating person, the identified movement mode is passed on to the system control unit 8 of the mobile C-arm X-ray device 1, and is set by the system control unit 8. In this way, the device trolley may then be moved in the movement mode that has been set. Thereby, typical context-related action patterns of the operating person are converted into suitable movements of the device without the user having to select the intended movement manually (e.g., with a button or lever). In addition, personalized movement profiles are possible if the operating person is recognized.

In order to indicate to the operating person which movement mode is set or the status of the hand recognition, display elements 13 are provided (e.g., LEDs or small screens). These may be arranged in the environment of the gripping element 7 or at another site of the mobile C-arm X-ray device 1. In addition, a display may also be provided on a conventional monitor. The monitor 11 may be arranged on the mobile C-arm X-ray device or on an additional mobile trolley 10.

In place of a gripping element 7 that may be used for gripping with two hands, for example, two smaller gripping elements with the corresponding sensors that are each provided for gripping with only one hand may be provided. The corresponding measurement data may then be evaluated together for both gripping elements together, and thus, for example, also whether gripping takes place with one hand and which type of gripping is taking place.

In addition to the movability, as an option, the adjustability of the C-arm 3 may also be set automatically in the manner described. Thus, also, two or more adjustment modes may exist for the adjustment of the C-arm (e.g., particular pre-settings in which one or more characteristics of the adjustment of the C-arm (slowly, quickly, rotation, etc.) are particularly supported and/or others are supported or blocked less or not at all). The C-arm itself is adjustable manually in a servo-assisted manner. On a further gripping element 17 that is provided for the manual servo-assisted adjustment of the C-arm by an operating person, capacitive sensors 12 and/or further sensors that capture measurement values that characterize the manner and/or the location of the gripping by the operating person are also arranged. The measurement values may subsequently be evaluated by the evaluating unit with regard to the manner and/or location of the gripping and associated with an adjustment mode of the C-arm. The adjustment mode is subsequently set automatically by the system control unit.

Figure 3:
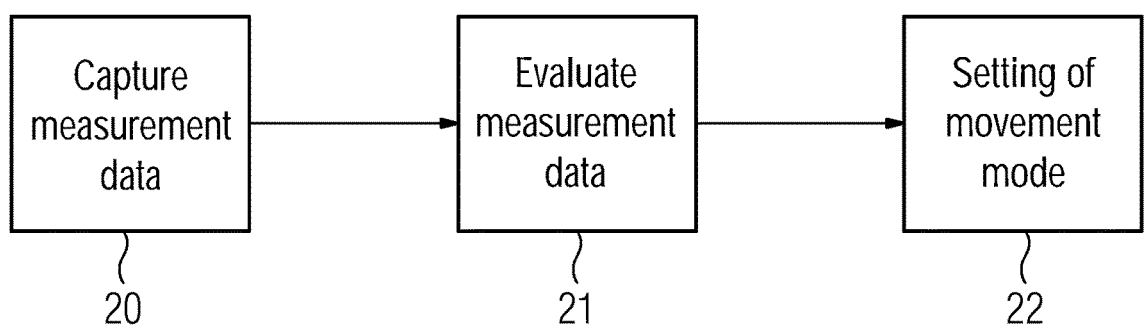
FIG. 3 shows a sequence of a method according to an embodiment for automatic operating assistance for a mobile C-arm X-ray device.

FIG. 3 shows one embodiment of a method for operating assistance for the mobile C-arm X-ray device of FIG. 1. In a first act 20, the measurement data that characterizes the manner and/or the location of the gripping by the at least one human hand is captured by the sensors (12, 15, 16). Subsequently, in a second act 21, the measurement data is evaluated with regard to the manner and/or location of the gripping and associated with a movement mode of the device trolley. In a third act 22, the movement mode determined is set automatically.

Using the present embodiments, a more efficient and more intuitive operation of the platform is possible, since now a blind operation by the operating person is provided. It is always clear to the operating person which movement mode is set since the operating person directly controls the movement mode by the manner of the gripping. The method for automatic operating assistance may be implemented in the control software of the mobile C-arm X-ray device.

Alternatively, the different movement modes may be set manually (e.g., by switches or via a user interface).

In addition, a mobile device having a device trolley that may be moved in at least two movement modes in a motor-assisted manner, having at least one gripping element is provided. The at least one gripping element is provided for a gripping by at least one human hand of an operating person for moving the device. The mobile device also has at least one sensor that is arranged on the gripping element or in the direct vicinity thereof and is configured to capture measurement data characterizing the manner and/or the location of the gripping by the at least one human hand. The mobile device includes an evaluating unit that is configured to evaluate the measurement data with regard to the manner and/or the location of the gripping and to associate the measurement data with a movement mode of the device trolley, and a control unit for automatic setting of the evaluated movement mode of the device trolley. The mobile device may also have a non-medical use. The mobile device may be, for example, a shopping trolley or a warehouse transport platform. For example, the present embodiments may be used for mobile devices with a high specific weight in order to provide easy maneuverability. Thus, for example, in the case of a shopping trolley, a first movement mode for one-handed operation (e.g., normal moving) and a second movement mode for two-handed operation (e.g., braked moving) may be set. Through the differentiation between a one-handed and a two-handed operation, safe movement may be provided on a sloping surface (e.g., a parking place). In this way, the shopping trolley may be precisely and easily steered regardless of the weight. In the case of a warehouse transport platform, for example, very large weights may be moved precisely since in logistics centers, many transport vehicles are still to be moved manually. Thus, a distinction may be drawn between, for example, a first movement mode (e.g., normal movement on the floor) with two-handed operation and a second movement mode (e.g., moving along and parallel to shelves) for one-handed operation.

The present embodiments may be briefly summarized in the following way: a mobile medical device (e.g., a mobile C-arm X-ray device) having a device trolley that may be moved in at least two movement modes in a motor-assisted manner, having at least one gripping element is provided. The at least one gripping element is provided for a gripping by at least one human hand of an operating person for moving the device. The mobile medical device also has at least one sensor that is arranged on the gripping element or in the direct vicinity thereof and is configured to capture measurement data characterizing the manner and/or the location of the gripping by the at least one human hand. The mobile medical device includes an evaluating unit that is configured to evaluate the measurement data with regard to the manner and/or the location of the gripping and to associate the measurement data with a movement mode of the device trolley. The mobile medical device includes a control unit for automatic setting of the evaluated movement mode of the device trolley.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A mobile medical device comprising:
a device trolley that is movable in at least two movement modes in a motor-assisted manner, the device trolley comprising at least one gripping element, wherein the at least one gripping element is grippable by at least one human hand of an operating person for moving the mobile medical device;
at least one sensor that is arranged on a gripping element of the at least one gripping element or in direct vicinity of the gripping element, the at least one sensor being configured to:
capture first measurement data characterizing a first manner, a first location, or the first manner and the first location of a first gripping by the at least one human hand; and
capture second measurement data characterizing a second manner, a second location, or the second manner and the second location of a second gripping by the at least one human hand;
an evaluating unit configured to:
evaluate the first measurement data with regard to first gripping characteristics of the first gripping, wherein the first gripping characteristics provide conclusions about a first movement of the mobile medical device planned or intended by the operating person; and
associate the first measurement data with a first movement mode of the at least two movement modes of the device trolley;
evaluate the second measurement data with regard to second gripping characteristics of the second gripping, wherein the second gripping characteristics provide conclusions about a second movement of the mobile medical device planned or intended by the operating person; and
associate the second measurement data with a second movement mode of the at least two movement modes of the device trolley;
a control unit configured to automatically set the associated first movement mode or the associated second movement mode of the device trolley,
wherein the first movement mode is configured such that on setting of the first movement mode, the first movement of the device trolley is supported, and the second movement mode is configured such that on setting the second movement mode, the second movement of the device trolley is supported, the second movement being slower than the first movement.

2. The mobile medical device of claim 1, wherein the at least one sensor is configured to capture measurement data characterizing a number of gripping hands of the at least one gripping hand, a size of the at least one gripping hand, a position of the at least one gripping hand, a contact area of the at least one gripping hand, a grip tightness of the gripping, a gripping profile of the operating person, or any combination thereof.

3. The mobile medical device of claim 1, wherein the at least one sensor comprises at least one capacitive sensor.

4. The mobile medical device of claim 1, wherein the at least two movement modes are settable in a personalized manner for at least two operating persons, the at least two operating persons including the operating person, and
wherein the at least one sensor is configured to capture measurement data characterizing a gripping profile of the operating person, the evaluating unit is configured to evaluate the measurement data with regard to the operating person and to associate the measurement data with a personalized movement mode, and the control unit is configured for automatic setting of the evaluated personalized movement mode.

5. The mobile medical device of claim 1, further comprising:
a mobile C-arm X-ray device having a rotatable C-arm that is adjustable in a plurality of degrees of freedom.

6. The mobile medical device of claim 5, wherein a first gripping element of the at least one gripping element is configured for pushing, pulling, or pushing and pulling the device trolley that is movable in the at least two movement modes in the motor-assisted manner, and a second gripping element of the at least one gripping element is configured for a gripping by the at least one human hand of the operating person for motor-assisted adjustment of the rotatable C-arm.

7. The mobile medical device of claim 6, wherein one or more sensors of the at least one sensor is arranged on the second gripping element or in direct vicinity of the second gripping element,
wherein the one or more sensors are configured to capture measurement data characterizing the manner, the location, or the manner and the location of the gripping by the at least one human hand, and
wherein the evaluating unit is further configured to evaluate the measurement data with regard to the manner, the location, or the manner and the location of the gripping and to associate the measurement data with an adjustment mode of the rotatable C-arm, and the control unit is further configured for automatic setting of the evaluated adjustment mode.

8. The mobile medical device of claim 1, wherein the at least one sensor comprises a plurality of sensors that are arranged on the at least one gripping element or in direct vicinity of the at least one gripping element.

9. The mobile medical device of claim 1, wherein the first movement mode of the at least two movement modes is configured such that on setting of the first movement mode, a rapid movement of the device trolley over distances greater than 4 m is supported.

10. The mobile medical device of claim 9, wherein the second movement mode of the at least two movements modes is configured such that on setting the second movement mode, a slow movement of the device trolley over distances less than 50 cm is supported.

11. The mobile medical device of claim 1, further comprising a display element operable to display information relating to an automatically activated movement mode of the at least two movement modes.

12. A method for automatic operating assistance for a mobile medical device having a device trolley that is movable in at least two movement modes in a motor-assisted manner and at least one gripping element for a gripping by at least one human hand of an operating person for moving the device trolley, the method comprising:
capturing first measurement data characterizing a first manner, a first location, or the first manner and the first location of a first gripping by the at least one human hand;
evaluating the first measurement data with regard to first gripping characteristics of the first gripping and associating the first measurement data with a first movement mode of the at least two movements modes of the device trolley, wherein the first gripping characteristics provide conclusions about a first movement of the mobile medical device planned or intended by the operating person;
capturing second measurement data characterizing a second manner, a second location, or the second manner and the second location of a second gripping by the at least one human hand;
evaluating the second measurement data with regard to second gripping characteristics of the second gripping and associating the second measurement data with a second movement mode of the at least two movements modes of the device trolley, wherein the second gripping characteristics provide conclusions about a second movement of the mobile medical device planned or intended by the operating person; and
automatic setting the associated first movement mode or the associated second movement mode of the device trolley,
wherein the first movement mode is configured such that on setting of the first movement mode, the first movement of the device trolley is supported, and the second movement mode is configured such that on setting the second movement mode, the second movement of the device trolley is supported, the second movement being slower than the first movement.

13. The method of claim 12, wherein the capturing of the first measurement data and the capturing of the second measurement data respectively comprises capturing measurement data characterizing a number of gripping hands, a size of a gripping hand or gripping hands, a position of the gripping hand or the gripping hands, a contact area of the gripping hand or the gripping hands, a grip tightness of the gripping, a gripping profile of the operating person, or any combination thereof.

14. The method of claim 12, wherein the at least two movement modes are settable in a personalized manner for at least two operating persons, the at least two operating persons including the operating person, and
wherein the capturing of the first measurement data and the capturing of the second measurement data respectively comprises capturing measurement data characterizing a gripping profile of an operating person of the at least two operating persons, and
wherein the measurement data is evaluated with regard to the operating person and is associated with a personalized movement mode, and the evaluated personalized movement mode is set automatically.

15. A mobile device comprising:
a device trolley that is movable in at least two movement modes in a motor-assisted manner, the device trolley including at least one gripping element, wherein the at least one gripping element is provided for a gripping by a human hand of an operating person for moving the mobile device;

at least one sensor that is arranged on the at least one gripping element or in direct vicinity of the at least one gripping element, and is configured to:

capture first measurement data characterizing a first manner, a first location, or the first manner and the first location of a first gripping by the human hand;

capture second measurement data characterizing a second manner, a second location, or the second manner and the second location of a second gripping by the human hand;

an evaluating unit configured to:

evaluate the first measurement data with regard to first gripping characteristics of the first gripping, wherein the first gripping characteristics provide conclusions about a first movement of the mobile device planned or intended by the operating person; and associate the first measurement data with a first movement mode of the at least two movement modes of the device trolley;

evaluate the second measurement data with regard to second gripping characteristics of the second gripping, wherein the second gripping characteristics provide conclusions about a second movement of the mobile medical device planned or intended by the operating person; and associate the second measurement data with a second movement mode of the at least two movement modes of the device trolley;

a control unit configured to automatically set the associated first movement mode or the associated second movement mode of the device trolley.

\* \* \* \* \*